Patented May 21, 1929.

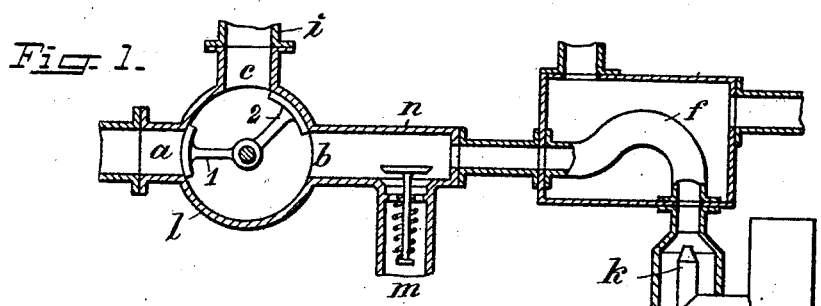
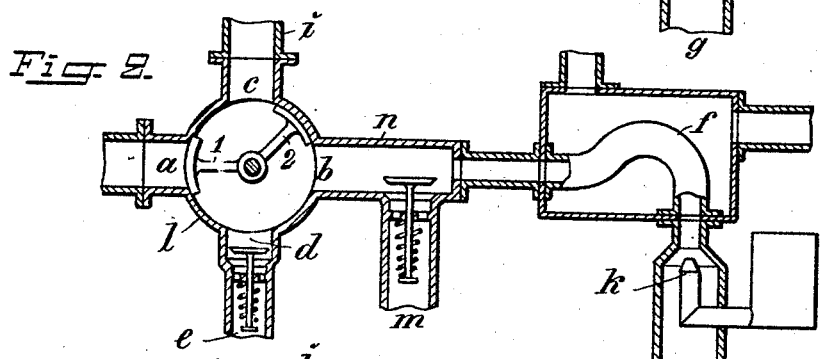
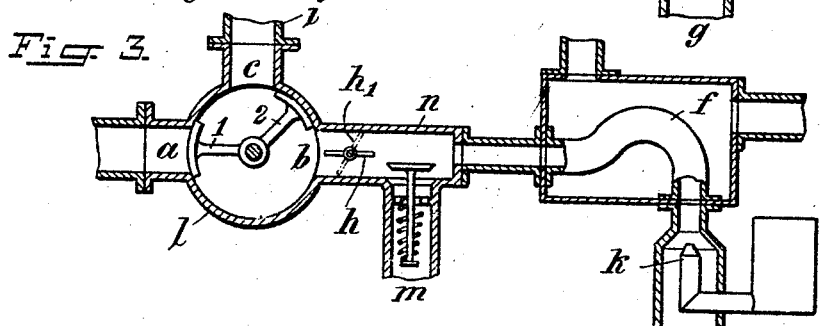
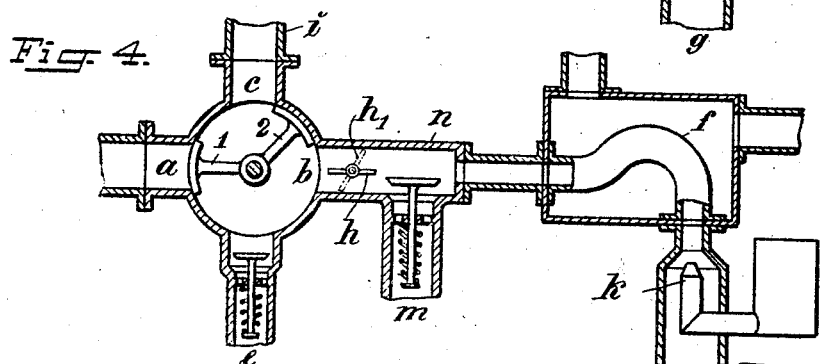

1,713,701

UNITED STATES PATENT OFFICE.

CARL FREDRIK GUNNAR KJELLBERG, OF STOCKHOLM, SWEDEN.

FUEL-CONTROLLING MEANS FOR THE OPERATION OF INTERNAL-COMBUSTION ENGINES WITH DIFFERENT FUELS.

Application filed January 17, 1921, Serial No. 438,049, and in Sweden January 26, 1920.

The present invention relates to fuel-controlling and mixing devices for internal combustion engines adapted to use at a time one of two or more fuels, such as petrol, kerosene, coal-gas etc., the said devices having for their purpose to facilitate the mixing of a fuel such as kerosene, which is not easily gasified, with air, and also to regulate such a mixture of fuel and air.

An object of the invention is to provide in a device of the above mentioned character, means whereby the motor can be started by a gas or a fuel easily gasified from coal, such as petrol, the apparatus being such that, where the carbureter in which a heavy fuel such as kerosene, that must be heated before vaporizing and mixed with air, has been heated enough by the hot exhaust gases from the motor, the fuel may be changed, there being provided for each fuel a separate carbureter, mixing chamber or the like which is separated from the others by cut-off members, valves or other devices for this purpose.

A further object of the invention is to provide an extra air-intake, by which device only a small amount of air passes with the fuel through the vaporizing pipe heated by the exhaust gases, while the rest of the air necessary for the explosive mixture is added through this extra air-intake, in order to use the major part of the heat at the vaporizing pipe to vaporize the fuel, since, if all the air would pass through the vaporizing pipe, this gradually should be cooled down by the cold air, and thus vaporization of the fuel would be the more incomplete and the motor would stop.

A further object of the invention is to provide another air-intake, by which a smaller quantity of extra air is added to the mixture of vaporized fuel and air, in order to make the mixture poorer, and to reduce the fuel consumption by running the motor at high speed, the said air-intake co-operating with the other fuels by which the motor is driven, for the purpose of having the same influence on all these fuels.

A further object of the invention is to provide a throttle valve for the control of the fuel supply in motors having wide speed variations, said valve being fitted as near as possible to the place where the vaporized fuel is mixed with the air, in order to attain a fine regulation of the mixture, and to cause an intermixture between the vaporized fuel and the air.

The invention is clearly illustrated in the accompanying drawing, in which:—

Fig. 1 is a vertical longitudinal sectional view of a carbureter device according to the invention, adapted for the employment of kerosene and intended for motors with only small speed variations;

Fig. 2 is a similar view of the same carbureter device, fitted with an air-intake for supplying either fuel supply with additional air;

Fig. 3 is a similar view of the carbureter device, analogous to Fig. 1 and fitted with a throttle valve, this device being intended for motors having large speed variations; and Fig. 4 is a similar view of a carbureter device, analogous to Fig. 1 fitted with a throttle valve and an air-intake for supplying either fuel supply with additional air.

Referring now, more particularly, to the drawing and especially to Fig. 1 the vaporized fuel mixed with air is sucked through the opening $c$ from the chamber $l$, which is provided with openings $a$ and $b$ for the different fuels, each having its cut-off member 1 and 2, and further through the inlet pipe $i$ into the cylinder. An internal combustion engine is preferably started by an easily vaporized fuel such as petrol, which is supplied from a carbureter through the opening $a$, opened by the cut-off member 1 to the cylinder, while the opening $b$ for a heavy fuel such as kerosene is shut by the cut-off member 2. The exhaust gases from the motor pass through a chamber provided with the vaporizing pipe $f$ for the heavy fuel. As soon as the vaporizing pipe $f$ has reached the vaporizing temperature, the fuel can be changed by the cut-off members 1 and 2.

In this case the opening $a$ is closed and a quantity of air entering through the opening $g$ sucks the fuel, such as kerosene, through the nozzle $k$ and air and fuel further pass through the vaporizer pipe $f$ wherein the fuel is vaporized and mixed with air. This concentrated fuel mixture is then mingled in the chamber $n$ with air entering through the air-intake $m$ which is furnished with an automatically working spring-loaded valve or other suitable device provided for the same purpose, the mixture then passing through the openings $b$ and $c$ and through the inlet pipe $i$ into the cylinder.

In Figs. 2 and 4, the chamber $l$ is provided with the opening $d$ for air, furnished with an automatically working spring-loaded valve or other suitable device provided for the same purpose, in order to supply the one as well as the other fuel with some air. The adjustment of this additional air-intake $d$ makes it possible to run the motor at high speed with poorer mixture and thus reduce the fuel consumption. Without departing from the principle of the invention this air-intake may be provided on the inlet pipe $i$.

In Figs. 3 and 4, the chamber $n$ is provided with a throttle valve $h$, $h^1$ for controlling the supply of fuel from the vaporizing pipe $i$, such fuel being mixed with the air from the air-inlet $m$.

Claims:

1. Fuel vaporizing device for internal combustion engines in connection with carburettors for different fuels, said device provided with cut-off members for each fuel-mixture, and with openings for the supply of air, and also with a conduit to the motor cylinder characterized by the provision of a conduit for leading fuel to one of the cut-off members, a vaporizing chamber arranged about said conduit and heated by the exhaust gases from the motor, and an air supply inlet in said conduit in order to supply the additional air to the fuel independently of the vaporizing chamber or the other fuel mixtures.

2. A device as set forth in claim 1, characterized by the provision in the connecting conduit, between the inlet for the air supply and the cut-off member for the fuel mixture, of a throttle valve in order to control the supply of the mixture of vaporized fuel and air to the motor cylinder.

In testimony whereof I affix my signature.

CARL FREDRIK GUNNAR KJELLBERG.